United States Patent
Meng (10) Patent No.: US 12,137,105 B2
(45) Date of Patent: Nov. 5, 2024

(54) SECURITY MANAGEMENT METHOD AND SECURITY MANAGEMENT APPARATUS

(71) Applicant: HUAWEI CLOUD COMPUTING TECHNOLOGIES CO., LTD., Gui'an New District (CN)

(72) Inventor: Zechao Meng, Shenzhen (CN)

(73) Assignee: Huawei Cloud Computing Technologies Co., Ltd., Gui'an New District (CN)

(*) Notice: Subject to any disclaimer, the term of this patent is extended or adjusted under 35 U.S.C. 154(b) by 785 days.

(21) Appl. No.: 17/091,877

(22) Filed: Nov. 6, 2020

(65) Prior Publication Data

US 2021/0058414 A1    Feb. 25, 2021

Related U.S. Application Data

(63) Continuation of application No. PCT/CN2019/087127, filed on May 16, 2019.

(30) Foreign Application Priority Data

Sep. 20, 2018 (CN) .......................... 201811101197.2

(51) Int. Cl.
*H04L 9/40* (2022.01)
*G06F 21/52* (2013.01)

(52) U.S. Cl.
CPC .......... *H04L 63/1416* (2013.01); *G06F 21/52* (2013.01); *G06F 2221/034* (2013.01)

(58) Field of Classification Search
CPC .. G06F 21/52; G06F 21/554; G06F 2221/034; H04L 63/1416; H04L 63/20
See application file for complete search history.

(56) References Cited

U.S. PATENT DOCUMENTS

| | | | | |
|---|---|---|---|---|
| 8,621,621 B1 * | 12/2013 | Burns | ..................... | G06F 21/54 726/22 |
| 8,738,906 B1 * | 5/2014 | Sampath | .............. | H04N 21/643 713/166 |
| 9,503,475 B2 * | 11/2016 | Fadida | ..................... | H04L 67/34 |
| 9,626,205 B2 * | 4/2017 | Yu | ........................... | G06F 21/53 |
| 10,671,726 B1 * | 6/2020 | Paithane | ............. | H04L 63/1416 |
| 11,165,823 B2 * | 11/2021 | Wu | ..................... | H04L 63/1416 |

(Continued)

FOREIGN PATENT DOCUMENTS

| | | |
|---|---|---|
| CN | 1801031 A | 7/2006 |
| CN | 101039179 A | 9/2007 |

(Continued)

*Primary Examiner* — Gary S Gracia
(74) *Attorney, Agent, or Firm* — Leydig, Voit & Mayer, Ltd.

(57) ABSTRACT

A security management arrangement for monitoring to detect a targeted attack on an application. Operation of the arrangement includes receiving a suspected attack alarm issued by a centralized security monitoring apparatus. The arrangement determines an application associated with the suspected attack alarm. The arrangement further operates to obtain monitoring information obtained through monitoring of the application. The arrangement further determines, based on the monitoring information, the application has been attacked.

12 Claims, 5 Drawing Sheets

(56) References Cited

U.S. PATENT DOCUMENTS

| | | | |
|---|---|---|---|
| 11,700,276 B1* | 7/2023 | Hodgman | H04L 63/1491 726/22 |
| 2005/0039104 A1* | 2/2005 | Shah | H04L 69/161 714/776 |
| 2008/0168562 A1* | 7/2008 | Haga | G06F 21/14 726/22 |
| 2008/0263668 A1* | 10/2008 | Chu | G06F 21/554 726/23 |
| 2013/0179971 A1* | 7/2013 | Harrison | G06F 21/564 726/23 |
| 2014/0033310 A1* | 1/2014 | Cheng | H04L 63/1416 726/23 |
| 2016/0055045 A1* | 2/2016 | Souza | G06F 11/079 714/57 |
| 2016/0241573 A1* | 8/2016 | Mixer | G06F 21/53 |
| 2016/0352761 A1* | 12/2016 | Mcgrew | H04L 63/166 |
| 2017/0230336 A1* | 8/2017 | Bingham | H04L 63/1491 |
| 2017/0351861 A1* | 12/2017 | El-Moussa | G06F 21/566 |
| 2018/0018459 A1* | 1/2018 | Zhang | G06F 21/566 |
| 2018/0034835 A1* | 2/2018 | Iwanir | H04L 63/1416 |
| 2018/0139215 A1* | 5/2018 | Neuvirth-Telem | G06F 21/577 |
| 2018/0293379 A1* | 10/2018 | Dahan | G06F 21/568 |
| 2019/0052675 A1* | 2/2019 | Krebs | H04L 63/1416 |
| 2019/0250937 A1* | 8/2019 | Thomas | G06F 9/5083 |
| 2020/0092165 A1* | 3/2020 | Sellers | H04L 41/0893 |
| 2022/0385676 A1* | 12/2022 | Chen Kaidi | H04L 63/1416 |

FOREIGN PATENT DOCUMENTS

| | | |
|---|---|---|
| CN | 102546641 A | 7/2012 |
| CN | 102937930 A | 2/2013 |
| CN | 103842965 A | 6/2014 |
| CN | 103929413 A | 7/2014 |
| CN | 104392175 A | 3/2015 |
| CN | 107370724 A | 11/2017 |
| CN | 107506648 A | 12/2017 |
| CN | 108270722 A | 7/2018 |
| CN | 109218315 A | 1/2019 |

* cited by examiner

SECURITY MANAGEMENT METHOD AND SECURITY MANAGEMENT APPARATUS

CROSS-REFERENCE TO RELATED APPLICATIONS

This application is a continuation of International Application No. PCT/CN2019/087127, filed on May 16, 2019, which claims priority to Chinese Patent Application No. 201811101197.2, filed on Sep. 20, 2018. The disclosures of the aforementioned applications are hereby incorporated by reference in their entireties.

TECHNICAL FIELD

This application relates to the communications field, and in particular, to a security management method and a security management apparatus.

BACKGROUND

Most enterprises use methods such as interception, defense, and policy-based control to intercept or generate an alarm for a suspected attack, to ensure network security. Common methods for ensuring network security include technologies such as antivirus, firewall, and blacklist and whitelist. An advanced targeted attack, also referred to as an advanced persistent threat (APT), is currently a most advanced attack mode. A hacker implementing an APT usually launches a targeted attack on a target. The APT can easily bypass traditional security protection measures such as a firewall and a blacklist- and whitelist-based prevention mechanism.

In the prior art, a running environment of an application may be continuously monitored, to effectively protect network security and handle a targeted attack by, for example, the APT targeting an application. A method to address such threat is to deploy a security management apparatus in each running environment of an application to perform continuous application behavior analysis.

In the prior art, the security management apparatus needs to be deployed in each running environment of an application. If the application has a plurality of running instances or the application is deployed in a system in a distributed manner (e.g., in a cloud computing system), when an application automatic deployment service in a platform as a service (PaaS) is used, the application is usually randomly distributed in the system. A specific running environment of the application, that is, a physical machine or a virtual machine on which the application is deployed is not determined. Therefore, the security management apparatus needs to be deployed in all running environments to perform the application behavior analysis. The deployment of the security management apparatus consumes resources of the running environment. Therefore, when the security management apparatus is deployed in all environments of the system, system resource consumption is relatively high.

SUMMARY

Illustrative embodiments provide a security management method and a security management apparatus, to reduce system resource consumption while a targeted attack on an application is handled.

A first aspect of the illustrative embodiments of this application provides a security management method, including: receiving a suspected attack alarm sent by a centralized security monitoring apparatus; determining an application associated with the suspected attack alarm; obtaining monitoring information obtained through monitoring of the application; and determining, based on the monitoring information, whether the application is attacked.

The centralized security monitoring apparatus deployed at a network ingress may intercept and defend against all suspected attacks, and generate the suspected attack alarm. After receiving the suspected attack alarm sent by the centralized security monitoring apparatus, a security management apparatus further determines, based on the suspected attack alarm, the application associated with the suspected attack alarm. The monitoring information may be obtained through the monitoring of the application. The security management apparatus may obtain the monitoring information, and determine, based on the monitoring information, whether the application is attacked.

According to the security management method provided in the illustrative embodiments of this application, the associated application is determined through the suspected attack alarm sent by the centralized security monitoring apparatus, and then the monitoring information for the application is obtained, to determine whether the application is attacked. According to the method provided in the illustrative embodiments of this application, application behavior analysis is performed on the associated application only when the suspected attack alarm is generated. This can handle an attack targeting at an application, for example, an APT. In addition, compared with deployment of the security management apparatus in each running environment, the method can reduce system resource consumption.

According to the first aspect of the illustrative embodiments of this application, in a first implementation of the first aspect of the illustrative embodiments of this application, before the determining an application associated with the suspected attack alarm, the method further includes extracting, from the attack alarm, an identifier used to associate the application.

According to the security management method provided in the illustrative embodiments of this application, a method for determining the application associated with the suspected attack alarm is provided. To be specific, the identifier used to associate the application is extracted from the attack alarm. The application at which the attack alarm targets is determined based on the identifier, so that implementability of this solution is improved.

According to the first implementation of the first aspect of the illustrative embodiments of this application, in a second implementation of the first aspect of the illustrative embodiments of this application, the identifier includes any one of the following: an internet protocol IP address associated with the application, a port number associated with the application, or a uniform resource locator URL associated with the application.

According to the security management method provided in the illustrative embodiments of this application, three specific identifiers used to determine the associated application are provided. The security management apparatus may determine the associated application based on any one of the three identifiers. This enhances diversity of solution implementations.

According to any one of the first aspect of the illustrative embodiments of this application, the first implementation of the first aspect of the illustrative embodiments of this application, or the second implementation of the first aspect of the illustrative embodiments of this application, in a third implementation of the first aspect of the illustrative embodiments of this application, before the obtaining monitoring information obtained through monitoring of the application, the method further includes: indicating to deploy a monitoring program in a running environment of the application, where the monitoring program is used to monitor the application and generate the monitoring information.

According to the security management method provided in the illustrative embodiments of this application, a specific manner of obtaining the monitoring information obtained through monitoring of the application is provided. To be specific, the security management apparatus may indicate to deploy the monitoring program in the running environment of the application, to monitor the application and generate the monitoring information, so that the implementability of this solution is improved.

According to the first aspect of the illustrative embodiments of this application, and the first implementation of the first aspect of the illustrative embodiments of this application to the third implementation of the first aspect of the illustrative embodiments of this application, in a fourth implementation of the first aspect of the illustrative embodiments of this application, after the determining, based on the monitoring information, whether the application is attacked, the method further includes: if it is determined, based on the monitoring information, that the application is attacked, stopping the application, isolating the application, or generating an alarm for the application.

According to the security management method provided in the illustrative embodiments of this application, when determining that the application is attacked, the security management apparatus may process the attack. This solution provides three processing manners, thereby enhancing the diversity of the solution implementations.

According to the third implementation of the first aspect of the illustrative embodiments of this application or the fourth implementation of the first aspect of the illustrative embodiments of this application, in a fifth implementation of the first aspect of the illustrative embodiments of this application, after the determining, based on the monitoring information, whether the application is attacked, the method further includes: deleting the monitoring program from the running environment of the application.

According to the security management method provided in the illustrative embodiments of this application, after the determining, based on the monitoring information, whether the application is attacked, the monitoring program in the running environment of the application may be deleted. This can save system resources.

A second aspect of the illustrative embodiments of this application provides a security management apparatus, including: a directional monitoring unit, configured to receive a suspected attack alarm sent by a centralized security monitoring apparatus, where the directional monitoring unit is further configured to determine an application associated with the suspected attack alarm; and an attack analysis unit, configured to obtain monitoring information obtained through monitoring of the application, where the attack analysis unit is further configured to determine, based on the monitoring information, whether the application is attacked.

According to the security management apparatus provided in the illustrative embodiments of this application, the directional monitoring unit may determine the associated application through the suspected attack alarm sent by the centralized security monitoring apparatus, and the attack analysis unit may obtain the monitoring information for the application, and determine, based on the monitoring information, whether the application is attacked. The security management apparatus provided in the illustrative embodiments of this application can handle an attack targeting at an application, for example, an APT. In addition, compared with deployment of the security management apparatus in each running environment, this application can reduce system resource consumption.

According to the second aspect of the illustrative embodiments of this application, in a first security management apparatus in the second aspect of the illustrative embodiments of this application, the directional monitoring unit is further configured to, before determining an application associated with the suspected attack alarm, extract, from the attack alarm, an identifier used to associate the application.

According to the second aspect of the illustrative embodiments of this application or the first security management apparatus in the second aspect of the illustrative embodiments of this application, in a second security management apparatus in the second aspect of the illustrative embodiments of this application, the directional monitoring unit is further configured to: before obtaining monitoring information obtained through monitoring of the application, indicate to deploy a monitoring program in a running environment of the application, where the monitoring program is used to monitor the application and generate the monitoring information.

According to the second aspect of the illustrative embodiments of this application, and the first security management apparatus in the second aspect of the illustrative embodiments of this application to the second security management apparatus in the second aspect of the illustrative embodiments of this application, in a third security management apparatus in the second aspect of the illustrative embodiments of this application, the security management apparatus further includes a deployment management unit, configured to: if it is determined, based on the monitoring information, that the application is attacked, stop the application, isolate the application, or generate an alarm for the application.

According to the second security management apparatus in the second aspect of the illustrative embodiments of this application or the third security management apparatus in the second aspect of the illustrative embodiments of this application, in a fourth security management apparatus in the second aspect of the illustrative embodiments of this application, the deployment management unit is further configured to: after the determining, based on the monitoring information, whether the application is attacked, delete the monitoring program from the running environment of the application.

A third aspect of the illustrative embodiments of this application provides a security management apparatus, including a processor, a memory, an input/output device, and a bus. The processor, the memory, and the input/output device are separately connected to the bus. The security management apparatus has a function of implementing the security management method in the first aspect.

A fourth aspect of the illustrative embodiments of this application provides a computer program product, where the computer program product includes an instruction. When the instruction is run on a computer, the computer is enabled to perform the method in the first aspect and the implementations of the first aspect.

A fifth aspect of the illustrative embodiments of this application provides a computer-readable storage medium, where the computer-readable storage medium stores an instruction. When the instruction is run on a computer, the computer is enabled to perform the method in the implementations provided in the first aspect of the illustrative embodiments of this application.

According to the foregoing technical solutions, it can be learned that the illustrative embodiments of this application have the following advantages.

According to the security management method and the security management apparatus provided in the illustrative embodiments of this application, the associated application may be determined through the suspected attack alarm sent by the centralized security monitoring apparatus, and then the monitoring information for the application is obtained, to determine whether the application is attacked. According to the method provided in the illustrative embodiments of this application, application behavior analysis is performed on the associated application only when the suspected attack alarm is generated. This can handle the attack targeting at the application, for example, the APT. In addition, compared with deployment of the security management apparatus in each running environment, the method can reduce the system resource consumption.

DESCRIPTION OF ILLUSTRATIVE EMBODIMENTS

Illustrative embodiments of this application provide a security management method in a cloud computing system, to reduce resource consumption of a running environment when application behavior analysis is performed.

To make the invention objectives, features, and advantages of this application clearer and more comprehensible, the following clearly describes the technical solutions in the illustrative embodiments of this application with reference to the accompanying drawings in the illustrative embodiments of this application.

Details are described below.

Figure 1:
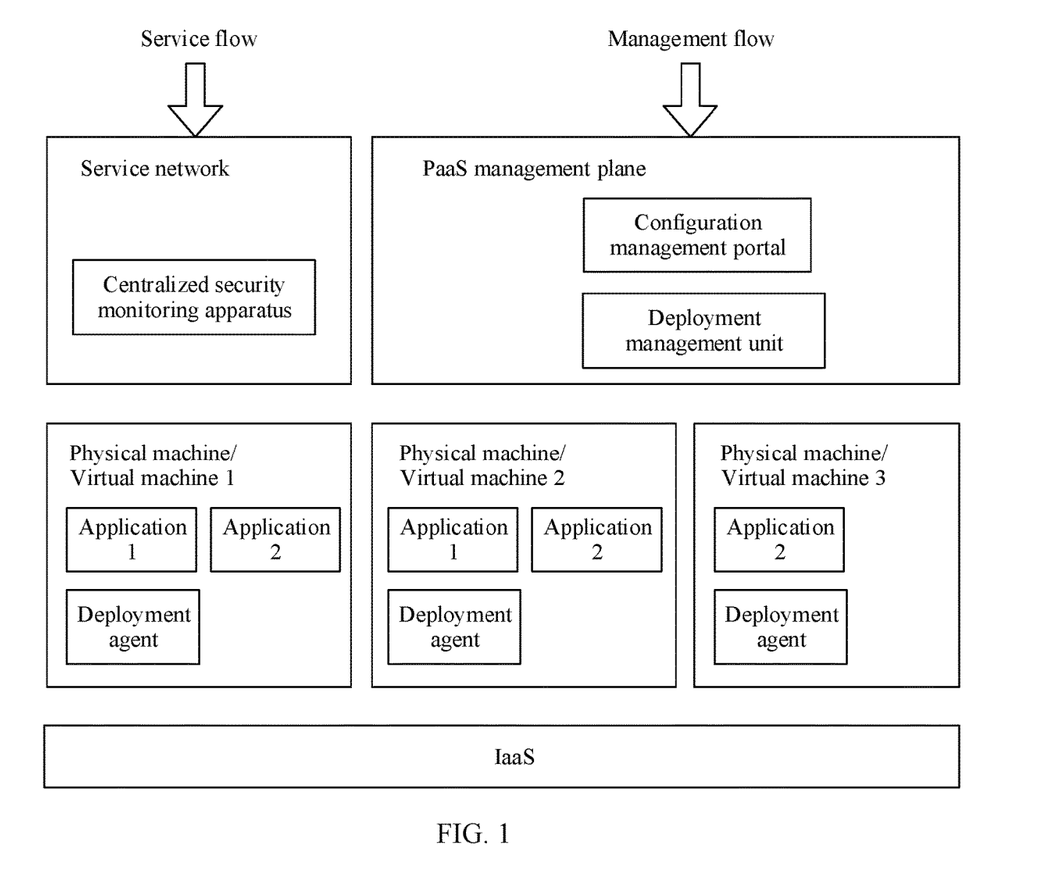
FIG. 1 is an architectural diagram of a cloud computing system.

The following first describes some possible application scenarios related to the technical solutions in the illustrative embodiments of this application by using an example with reference to FIG. 1. It should be noted that this solution is applicable to a system in which a plurality of applications are deployed in one environment and there is a same application deployment management unit. In the illustrative embodiments of this application and the following illustrative embodiments, a cloud computing system is used as an example for description. FIG. 1 shows an architecture of the cloud computing system.

There is an infrastructure as a service (IaaS) platform and a platform as a service (PaaS) platform in the cloud computing system.

The IaaS platform is a physical resource management platform in the cloud computing system. The IaaS platform may provide a virtual machine or a physical machine as a running environment of the PaaS, and provide virtual resources for the upper-layer PaaS platform. A core function of the PaaS platform is life cycle management of an application, including deployment, upgrading, and uninstallation of the application. The core function is provided by a deployment management unit. The deployment management unit centrally delivers an application management command, and an agent module deployed in each running environment performs a specific action. In the cloud computing system, when an application automatic deployment service in the PaaS is used, an application is usually randomly distributed on any physical machine or virtual machine in the system. For example, in the figure, an application 1 is separately deployed on a physical machine or virtual machine 1 and a physical machine or virtual machine 2, and an application 2 is deployed on three physical machines or virtual machines.

A service network is an important network that provides an application in the cloud computing system. The service network can open the internally deployed application to the internet. A centralized security monitoring apparatus may be deployed in the service network, to ensure service network security. The centralized security monitoring apparatus is usually deployed in an explicit channel through which a user or a hacker uses a World Wide Web (WWW) service to access an application in the service network. In this way, security analysis may be performed on each request for accessing the application. However, because the hacker implementing an APT attack usually launches a targeted attack on a target application, a security protection measure of the centralized security monitoring apparatus may be bypassed.

Figure 2:
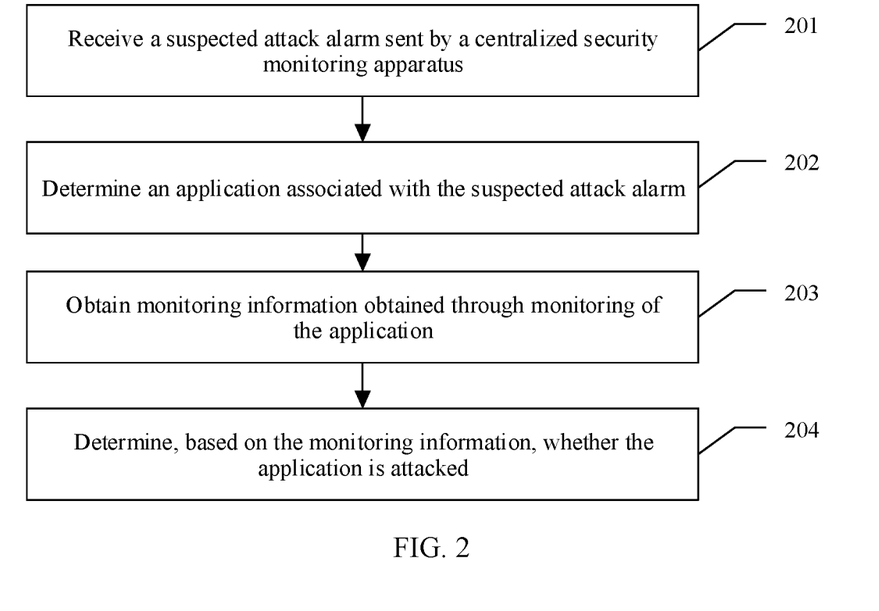
FIG. 2 is a schematic diagram of an embodiment of a security management method according to an embodiment of this application.

Based on the system architecture shown in FIG. 1, referring to FIG. 2, an embodiment of this application provides a security management method to resolve the targeted attack on the application. Based on the system architecture shown in FIG. 1, FIG. 2 is a schematic diagram of an embodiment of the security management method according to the embodiment of this application.

201: Receive a suspected attack alarm sent by a centralized security monitoring apparatus.

The centralized security monitoring apparatus is a device deployed at a network ingress for analyzing traffic and behaviors. Security analysis can be performed on each access request for an application in a service network. A targeted attack on a specific application usually first attempts to use a common method to attack. After a plurality of sniffing operations are performed to detect vulnerabilities, the targeted attack on the application is launched. The common attack method is easily detected by the centralized security monitoring apparatus, and when detecting these suspected attacks, the centralized security monitoring apparatus may generate the suspected attack alarm.

A security management apparatus may receive, in a plurality of manners, the suspected attack alarm sent by the centralized security monitoring apparatus.

Optionally, when detecting a suspected attack, the centralized security monitoring apparatus may report the suspected attack to the security management apparatus.

Optionally, the security management apparatus may periodically query the centralized security monitoring apparatus, to continuously monitor the centralized security monitoring apparatus. A manner in which the security management apparatus obtains the suspected attack alarm is not limited herein.

202: Determine an application associated with the suspected attack alarm.

Because information such as an attacked object and an event type is recorded in the attack alarm, the security management apparatus may determine the associated application based on the information recorded in the attack alarm. Optionally, an identifier associated with the application may be an IP address, a port number, a URL, or the like. It may be understood that, if the suspected attack alarm generated by the centralized security monitoring apparatus is associated with a specific application, the application has a risk of being attacked by the targeted attack.

203: Obtain monitoring information obtained through monitoring of the application.

Because the application associated with the suspected attack alarm has the risk of being attacked by the targeted attack, application behavior monitoring needs to be performed on the application, to obtain the monitoring information. For example, a monitoring program may be deployed in a local running environment of the application to perform the application behavior monitoring. The security management apparatus may obtain the monitoring information through the monitoring of the application.

204: Determine, based on the monitoring information, whether the application is attacked.

The security management apparatus may determine, based on the monitoring information, whether the application is attacked. In an example, the security management apparatus may perform determining according to a preset detection rule through an attack analysis unit. The attack analysis unit may receive the monitoring information reported by the monitoring program, and perform summarization or association analysis to determine whether the application is attacked.

According to the security management method provided in this embodiment of this application, the application targeted by the attack may be determined based on the suspected attack alarm generated by the centralized security monitoring apparatus. The monitoring information obtained through the monitoring of the application behavior is obtained, and then whether the application is attacked is further determined. It can be learned that the security management method provided in this embodiment of this application can handle an attack on a specific application, and improve network security.

Figure 3:
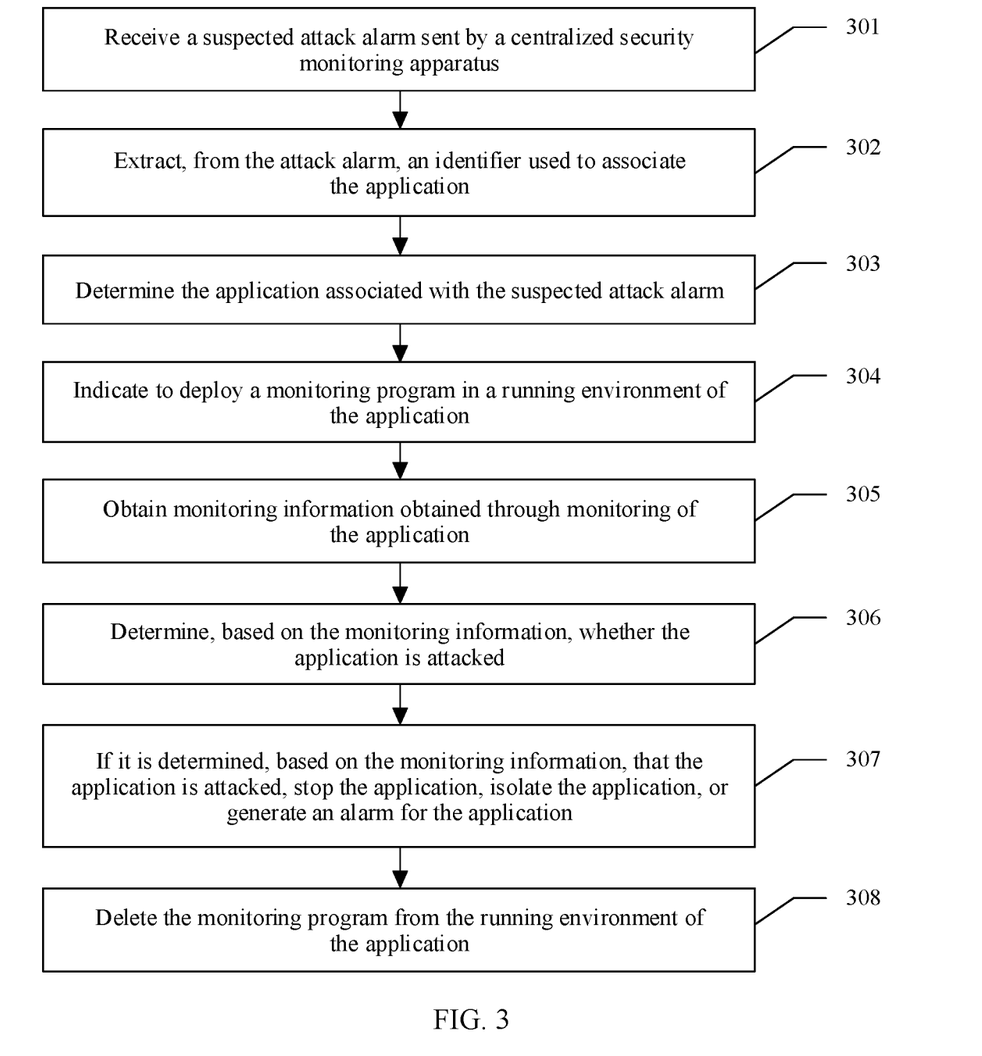
FIG. 3 is a schematic diagram of another embodiment of a security management method according to an embodiment of this application.

FIG. 3 is a schematic diagram of an embodiment of a security management method according to an embodiment of this application.

301: Receive a suspected attack alarm sent by a centralized security monitoring apparatus.

The centralized security monitoring apparatus is a device deployed at a network ingress for analyzing traffic and behaviors. For example, the centralized security monitoring apparatus may be an intrusion detection system (IDS), a web application firewall (WAF), also referred to as a web application protection system, or the like. Because the centralized security monitoring apparatus is deployed in an explicit channel through which a user or a hacker accesses a web service, the centralized security monitoring apparatus may perform security analysis on each request for accessing an application.

The analysis action of the centralized security monitoring apparatus includes structured query language (SQL) injection analysis of a hypertext transfer protocol (HTTP) request, cross-site scripting (XSS) attack analysis, web server vulnerability attack analysis, and the like.

A targeted attack on a specific application usually first attempts to use a common method to attack. After a plurality of sniffing operations are performed to detect vulnerabilities, the targeted attack on the application is launched. The common attack method is easily detected by the centralized security monitoring apparatus, and when detecting these suspected attacks, the centralized security monitoring apparatus may generate the suspected attack alarm.

A security management apparatus may receive the suspected attack alarm sent by the centralized security monitoring apparatus. Optionally, when detecting a suspected attack, the centralized security monitoring apparatus may report the suspected attack to the security management apparatus. Optionally, the security management apparatus may periodically query the centralized security monitoring apparatus, to continuously monitor the centralized security monitoring apparatus. A manner in which the security management apparatus obtains the suspected attack alarm is not limited herein.

302: Extract, from the attack alarm, an identifier used to associate the application.

When detecting the suspected attack behavior, the centralized monitoring apparatus may generate the attack alarm, and attack information such as an attacked object and an event type is recorded in the attack alarm. The security management apparatus may extract, from the attack alarm, the identifier used to associate the application. The identifier associated with the application is information used to indicate a specific application. Specifically, the identifier may be an internet protocol IP address associated with the application, a port number associated with the application, or a uniform resource locator URL associated with the application. It may be understood that the security management apparatus may extract, from the attack alarm, one or more identifiers associated with the application. A quantity and a type of the identifiers are not specifically limited herein.

303: Determine the application associated with the suspected attack alarm.

The security management apparatus may determine, based on the identifier that is associated with the application and that is extracted in step 302, the application associated with the suspected attack alarm. Specifically, the security management apparatus may determine the specific application based on one or more of the IP address, the port number, or the URL. Details are described below.

In an optional implementation, the security management apparatus may determine, based on the IP address, the application associated with the suspected attack. It is assumed that an access address of an application A is http://172.10.0.1:8080, and an access address of an application B is http://172.10.0.2:8080. If the IP address of the associated application extracted from the attack alarm is 172.10.0.2, it may be determined that the application associated with the suspected attack alarm is the application B.

In another optional implementation, the security management apparatus may determine, based on the URL, the application associated with the suspected attack. It is assumed that a URL of the application A is http://cloud.com/appa, and a URL of the application B is http://cloud.com/appb. If the URL extracted from the attack alarm is http://cloud.com/appa, it may be determined that the application associated with the suspected attack is the application A.

In another optional implementation, the security management apparatus may determine, based on the port number, the application associated with the suspected attack. It is assumed that an application gateway performs address convergence and provides only one IP address externally. The security management apparatus may determine the associated application based on the port number. It is assumed that a port number of the application A is 8080, and a port number of the application B is 443. If the port number extracted from the attack alarm is 8080, it may be determined that the application associated with the suspected attack is the application A.

In another optional implementation, the security management apparatus may determine, based on both the IP address and the port number, the application associated with the suspected attack alarm. It is assumed that the access address of the application A is http://172.10.0.1:8080, and the access address of the application B is http://172.10.0.2:443. If the IP address and the port number of the associated application extracted from the attack alarm are 172.10.0.2 and 443, it may be determined that the application associated with the suspected attack alarm is the application B.

It may be understood that, if the suspected attack alarm generated by the centralized security monitoring apparatus is associated with a specific application, the application has a risk of being attacked.

304: Indicate to deploy a monitoring program in a running environment of the application.

The security management apparatus may indicate to deploy the monitoring program in the running environment of the application. After determining the application associated with the suspected attack alarm, the security management apparatus may deploy the monitoring program in the running environment of the application. Preferably, in a cloud computing system, a deployment management unit of a PaaS platform may be called to deliver the monitoring program to the running environment of the application for deployment. The security management apparatus may further trigger, after determining the application associated with the suspected attack alarm, the pre-deployed monitoring program in the running environment to run. An occasion for deploying the monitoring program in the running environment of the application is not limited herein.

The monitoring program is a program used to perform attack behavior analysis locally in the application. A log of the application, and a behavior such as calling of a system and accessing of a file, may be monitored and analyzed. The monitoring program may be a general monitoring program, or may be a program that is customized by an administrator and uploaded to the security management apparatus. It may be understood that a plurality of monitoring programs may be preset in the security management apparatus, and different monitoring programs may target at specific applications or specific attacks. A quantity and a type of the monitoring programs are not limited herein. The security management apparatus may determine the monitoring program based on the application associated with the attack alarm, and may determine the monitoring program based on the application associated with the attack alarm and the attack type. This is not limited herein.

The application may have one or more running environments. For example, in the cloud computing system, the application may be deployed on different physical machines or virtual machines in the system in a distributed manner. The application may have a plurality of running instances that are distributed in different running environments. For example, a web application program usually has three components: a web front end, a web server (web server), and a database. In the cloud computing system, application instances of the three components may run on different physical machines or virtual machines. Preferably, the security management apparatus may indicate to deploy the monitoring program in all running environments of the application.

305: Obtain monitoring information obtained through monitoring of the application.

After the monitoring program is deployed in the running environment of the application, the monitoring program may perform application behavior analysis on the application. For example, the monitoring program may monitor the log of the application, and the behavior such as the calling of the system and the accessing of the file. After an attack detection transaction is completed, the monitoring information is obtained, and the security management apparatus may obtain the monitoring information obtained by the monitoring program by monitoring the application.

306: Determine, based on the monitoring information, whether the application is attacked.

The security management apparatus may determine, based on the monitoring information, whether the application is attacked. Preferably, the security management apparatus may perform determining according to a preset detection rule through an attack analysis unit. The attack analysis unit may receive the monitoring information reported by the monitoring program, and perform summarization and association analysis to determine whether the application is attacked.

For example, if the web front end, the web server, and the database of the web application separately run on three different physical machines or virtual machines, the three physical machines or virtual machines may obtain the monitoring information through the monitoring program, and the attack analysis unit may perform, based on the monitoring information sent by the web front end, the web server, and the database, the summarization or the association analysis.

Example 1: If the web front end reports information of a login failure, but no anomaly is found in the monitoring information of the web server and the database, the attack analysis unit may determine, based on the monitoring information of the web front end, the web server, and the database, that the attack fails at the web front end, and there is no risks during the monitoring.

Example 2: If a quantity of times that the monitoring information of the web front end reports the information of the login failure exceeds a preset threshold, and a quantity of times that the monitoring information of the database reports and that the log is logged in within a preset time interval exceeds a preset threshold, the attack analysis unit may determine that the attack may reach the database. In other words, a high-risk attack is detected during the monitoring.

307: If it is determined, based on the monitoring information, that the application is attacked, stop the application, isolate the application, or generate an alarm for the application.

If the security management apparatus determines, based on the monitoring information, that the application is attacked, the security management apparatus may process the attack event.

Optionally, the security management apparatus may stop the application. In this way, an attack process can be immediately blocked, a loss is minimized, and the application can no longer provide a service.

Optionally, the security management apparatus may isolate the application, limit usage of a CPU and a memory of the application, limit interworking between internal networks, and the like. In this way, the attacked application may be prevented from further affecting another normal application, for example, suddenly occupying a large quantity of CPU and memory resources, and the like. After being isolated, the application can still provide the service externally.

Optionally, the security management apparatus may present the attack alarm only on a configuration management portal (portal), and a decision needs to be made by operation and maintenance personnel. When the application is stopped or isolated, the attack alarm may also be displayed on the portal at the same time.

An attack processing manner of the security management apparatus is not limited herein.

308: Delete the monitoring program from the running environment of the application.

After determining, based on the monitoring information, whether the application is attacked, the security management apparatus may delete the monitoring program from the running environment of the application, to release resources.

It should be noted that step 308 may be performed after step 305, to be specific, an execution sequence between step 308 and step 306 to step 307 is not limited herein.

According to the security management method provided in this embodiment of this application, the identifier associated with the application may be obtained from the suspected attack alarm generated by the centralized security monitoring apparatus, to further determine the specific application at which the attack is targeted. The monitoring program is deployed in the running environment of the application to monitor the application behavior, and the monitoring information may be obtained to determine whether the application is attacked. Finally, the monitoring program may be deleted from the application running environment. It can be learned that according to the security management method provided in this embodiment of this application, not only the specific monitoring program is deployed for the attack on the specific application, but also resource waste caused by continuous deployment of the monitoring program in the running environment can be effectively reduced.

The foregoing describes the security management method in the illustrative embodiments of this application, and the illustrative embodiments of this application further provide a related apparatus configured to implement the foregoing solution. The following describes the security management apparatus for implementing the security management method.

Figure 4:
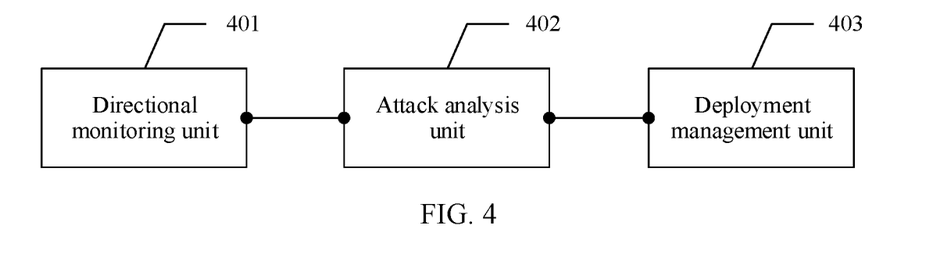
FIG. 4 is a schematic diagram of an embodiment of a security management apparatus according to an embodiment of this application.

FIG. 4 is a schematic diagram of an embodiment of a security management apparatus according to an embodiment of this application.

The security management apparatus provided in this embodiment of this application includes: a directional monitoring unit 401, configured to receive a suspected attack alarm sent by a centralized security monitoring apparatus, where the directional monitoring unit 401 is further configured to determine an application associated with the suspected attack alarm; and an attack analysis unit 402, configured to obtain monitoring information obtained through monitoring of the application, where the attack analysis unit 402 is further configured to determine, based on the monitoring information, whether the application is attacked.

Optionally, the directional monitoring unit 401 is further configured to, before determining an application associated with the suspected attack alarm, extract, from the attack alarm, an identifier used to associate the application.

Optionally, the directional monitoring unit 401 is further configured to: before obtaining monitoring information obtained through monitoring of the application, indicate to deploy a monitoring program in a running environment of the application. The monitoring program is used to monitor the application and generate the monitoring information.

Optionally, the security management apparatus further includes a deployment management unit 403, configured to: if it is determined, based on the monitoring information, that the application is attacked, stop the application, isolate the application, or generate an alarm for the application.

Optionally, the deployment management unit 403 is further configured to: after the determining, based on the monitoring information, whether the application is attacked, delete the monitoring program from the running environment of the application.

It should be noted that the directional monitoring unit in this embodiment of this application may be an independent device, or may be integrated into one device with the attack analysis unit and the deployment management unit. This is not specifically limited herein.

According to the security management apparatus provided in this embodiment of this application, the directional monitoring unit 401 may determine the associated application through the suspected attack alarm sent by the centralized security monitoring apparatus, and the attack analysis unit 402 may obtain the monitoring information for the application, and determine, based on the monitoring information, whether the application is attacked. The security management apparatus provided in this embodiment of this application can handle an attack targeting at an application, for example, an APT. In addition, compared with deployment of the security management apparatus in each running environment, this application can reduce system resource consumption.

Figure 5:
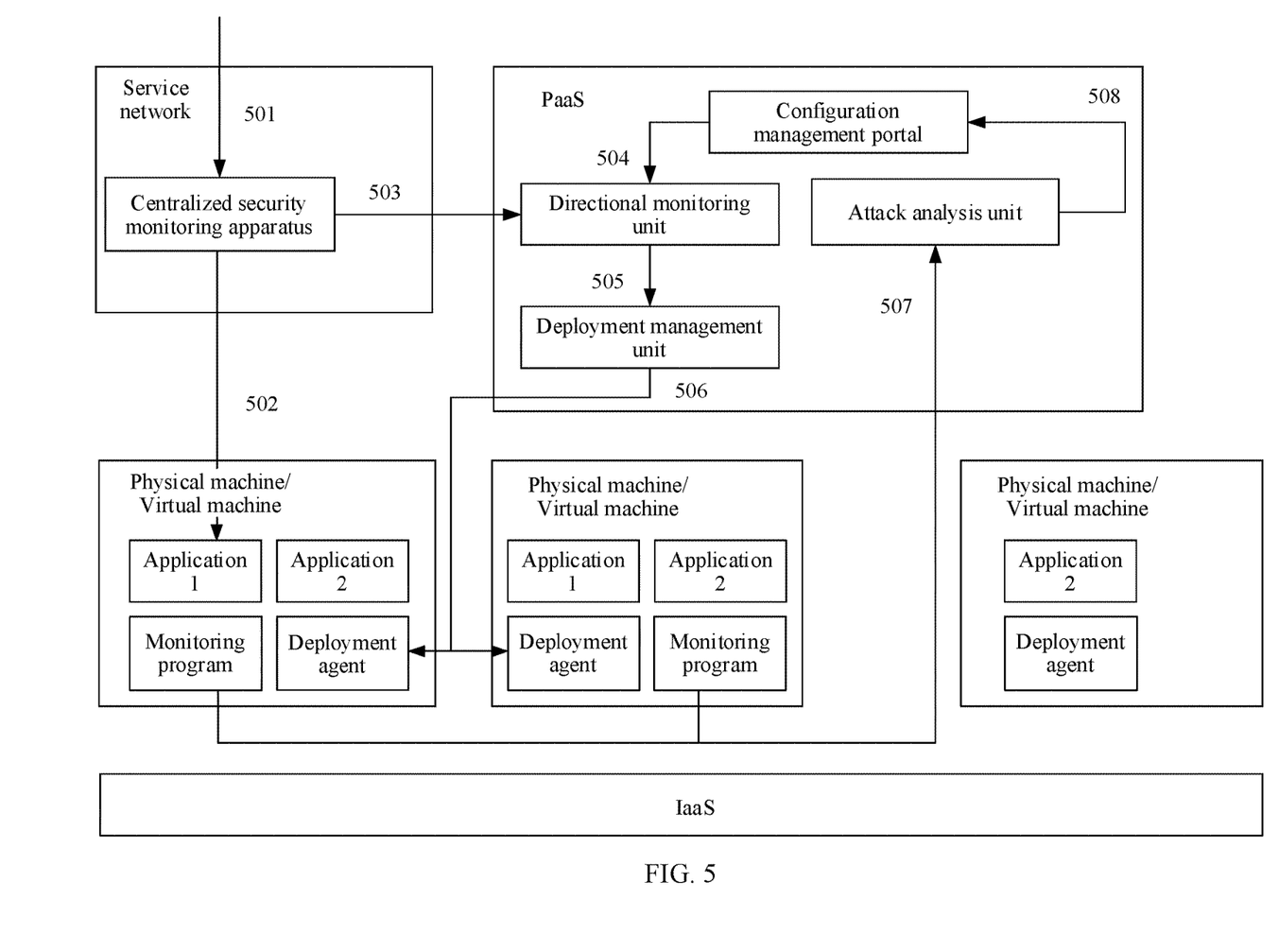
FIG. 5 is a schematic diagram of another embodiment of a security management apparatus according to an embodiment of this application.

To better understand and implement the foregoing solution in this embodiment of this application, the following uses a specific application scenario as an example for description. FIG. 5 is a schematic diagram of another embodiment of a security management apparatus according to an embodiment of this application.

There is an IaaS platform and a PaaS platform in a cloud computing system. The IaaS platform provides a virtual machine or physical machine as a running environment of the PaaS. The PaaS platform is responsible for life cycle management of an application, including deployment, upgrading, and uninstallation of the application. The core function is provided by a deployment management unit. The deployment management unit cooperates with a deployment agent module in each running environment to perform a specific action.

In this embodiment of this application, a directional monitoring unit and an attack analysis unit are deployed in the PaaS platform. A centralized security monitoring device is deployed in a service network to perform security analysis on each request for accessing the application.

The application is distributed on a plurality of physical machines or virtual machines in the system. For example, in the figure, an application 1 is separately deployed on a physical machine or virtual machine 1 and a physical machine or virtual machine 2, and an application 2 is deployed on three physical machines or virtual machines.

In step 501 to step 502, an application access request or an attack request accesses the application. When the request accesses a service network ingress, the centralized security monitoring apparatus performs the security analysis on the request, and generates an attack alarm if a suspected attack is detected.

In step 503, the directional monitoring unit may obtain the suspected attack alarm, and extract, from the attack alarm, an identifier associated with the application, for example, an internet protocol IP address, a port number of the application, or a uniform resource locator URL associated with the application. For example, in this embodiment, the directional monitoring unit determines that the application associated with the suspected attack alarm is the application 1.

In step 504, an administrator may preset a monitoring program in the directional monitoring unit by a management portal, where the monitoring program may be associated with a specific application.

Step 505 to step 506 are a process of deploying the monitoring program, and the directional monitoring unit may determine the proper monitoring program based on the attacked application. Then, the monitoring program may be delivered to the running environment of the application through the deployment management unit and the deployment agent module in the physical machine or virtual machine. For example, the monitoring program is delivered to the physical machine or virtual machine 1 and the physical machine or virtual machine 2 on which the application 1 is deployed.

In step 507, the monitoring program may perform corresponding application behavior analysis on the application 1, and send monitoring information to the attack analysis unit.

In step 508, the attack analysis unit receives the monitoring information, and may further analyze and determine whether the application 1 is attacked. If the application 1 is attacked, the attack analysis unit may present the attack alarm on the configuration management portal (portal).

According to the security management method provided in this embodiment of this application, the identifier associated with the application may be obtained from the suspected attack alarm generated by the centralized security monitoring apparatus, to further determine the specific application at which the attack is targeted. The monitoring program is deployed in the running environment of the application to monitor application behavior, and the monitoring information may be obtained to determine whether the application is attacked. Finally, the monitoring program may be deleted from the application running environment. It can be learned that according to the security management method provided in this embodiment of this application, not only the specific monitoring program is deployed for the attack on the specific application, but also resource waste caused by continuous deployment of the monitoring program in the running environment can be effectively reduced.

Figure 6:
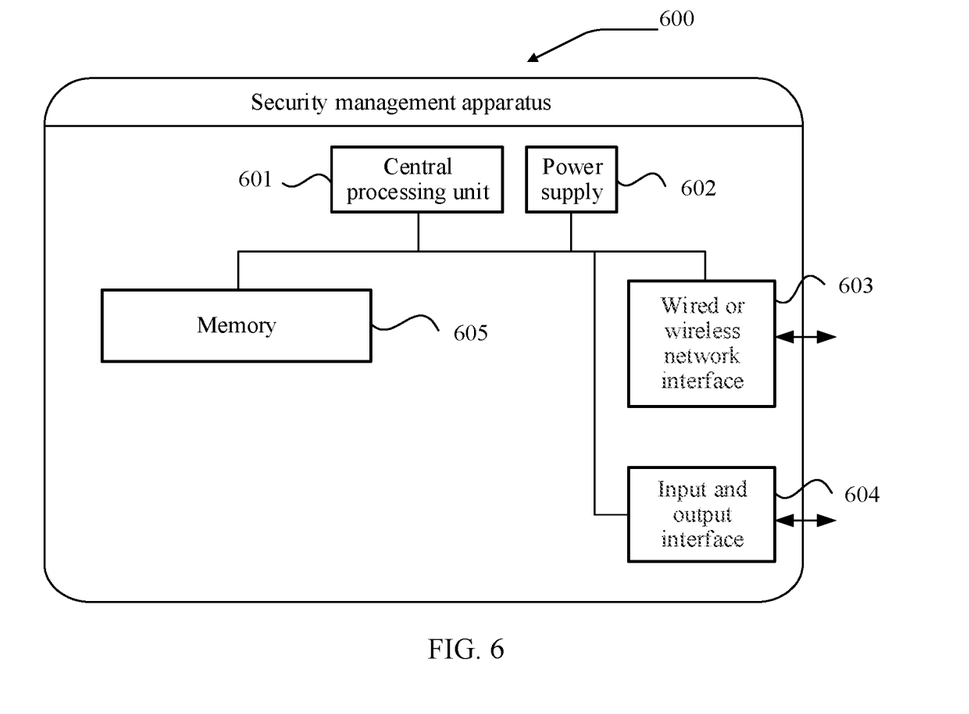
FIG. 6 is a schematic diagram of another embodiment of a security management apparatus according to an embodiment of this application.

FIG. 6 is a schematic diagram of another embodiment of a security management apparatus according to an embodiment of this application.

The security management apparatus 600 may have a relatively large difference due to different configurations or performance, and may include one or more central processing units (CPU) 601 (for example, one or more processors) and a memory 605. The memory 605 stores data or one or more application programs.

The memory 605 may be volatile storage or persistent storage. The program stored in the memory 605 may include one or more modules, and each module may include a series of instruction operations for the security management apparatus. Further, the central processing unit 601 may be configured to communicate with the memory 605, and perform, on the security management apparatus 600, the series of instruction operations in the memory 605.

The security management apparatus 600 may further include one or more power supplies 602, one or more wired or wireless network interfaces 603, one or more input and output interfaces 604, and/or one or more operating systems such as Windows Server™, Mac OS X™, Unix™, Linux™, and FreeBSD™.

A process executed by the central processing unit 601 in the security management apparatus 600 in this embodiment is similar to the method process described in the illustrative embodiments shown in FIG. 2 to FIG. 3, and details are not described herein again.

It may be clearly understood by a person skilled in the art that, for a purpose of convenient and brief description, for a detailed working process of the foregoing system, apparatus, and unit, refer to a corresponding process in the foregoing method embodiment, and details are not described herein again.

In the several illustrative embodiments provided in this application, it should be understood that the disclosed system, apparatus, and method may be implemented in another manner. For example, the described apparatus embodiment is merely an example. For example, the unit division is merely logical function division and may be another division in an actual implementation. For example, a plurality of units or components may be combined or integrated into another system, or some features may be ignored or not performed. In addition, the displayed or discussed mutual couplings, direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the illustrative embodiments.

In addition, functional units in the illustrative embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for enabling a computer device (which may be a personal computer, a server, or a network device) to perform all or some of the steps of the methods described in the illustrative embodiments of this application. The foregoing storage medium includes any medium that can store program code, such as a USB flash drive, a removable hard disk, a read-only memory (ROM), a random access memory (RAM), a magnetic disk, or a compact disc.

The foregoing illustrative embodiments are merely intended for describing the technical solutions of this application, but not for limiting this application. Although this application is described in detail with reference to the foregoing illustrative embodiments, people of ordinary skill in the art should understand that they may still make modifications to the technical solutions described in the foregoing illustrative embodiments or make equivalent replacements to some technical features thereof, without departing from the spirit and scope of the technical solutions of the illustrative embodiments of this application.

What is claimed is:

1. A security management method carried out on behalf of an application deployable in a multi-machine operating environment, the method comprising:
   receiving a suspected attack alarm from a centralized security monitoring apparatus;
   extracting, from the suspected attack alarm, an identifier used to associate the application;
   determining, in accordance with the identifier, the application associated with the suspected attack alarm;
   issuing, in accordance with the receiving a suspected attack alarm and the determining the application associated with the suspected attack alarm, a request for a monitoring program to be deployed to an operating environment of the application, wherein the monitoring program is executed in the operating environment to generate a monitoring information during operation of the application;
   obtaining, in accordance with the issuing the request and by executing the monitoring program deployed to and executed in the operating environment, the monitoring information of the application;
   determining, in accordance with the obtaining and based on the monitoring information of the application, the application has been attacked;
   stopping or isolating, in accordance with the determining the application has been attacked, the application; and
   deleting, after the determining the application has been attacked, the monitoring program from the operating environment of the application.

2. The method according to claim 1, wherein the identifier comprises at least one of the group consisting of:
   an internet protocol (IP) address associated with the application,
   a port number associated with the application, and
   a uniform resource locator (URL) associated with the application.

3. A security management apparatus, comprising:
   a processor,
   a non-transitory memory comprising executable instructions that, when executed by the processor, facilitate carrying out the following operations on behalf of an application deployable in a multi-machine operating environment:
      receiving a suspected attack alarm from a centralized security monitoring apparatus;
      extracting, from the suspected attack alarm, an identifier used to associate the application;
      determining, in accordance with the identifier, the application associated with the suspected attack alarm;
      issuing, in accordance with the receiving a suspected attack alarm and the determining the application associated with the suspected attack alarm, a request for a monitoring program to be deployed to an operating environment of the application, wherein the monitoring program is executed in the operating environment to generate a monitoring information during operation of the application;
      obtaining, in accordance with the issuing the request and by executing the monitoring program deployed to and executed in the operating environment, the monitoring information of the application;
      determining, in accordance with the obtaining and based on the monitoring information of the application, the application has been attacked;
      stopping or isolating, in accordance with the determining the application has been attacked, the application; and
      deleting, after the determining the application has been attacked, the monitoring program from the operating environment of the application.

4. The apparatus according claim 3, wherein the identifier comprises at least one of the group consisting of:
   an internet protocol (IP) address associated with the application,
   a port number associated with the application, and
   a uniform resource locator (URL) associated with the application.

5. A non-transitory computer-readable medium comprising computer-executable instructions that, when executed by a processor, facilitate carrying out the following operations on behalf of an application deployable in a multi-machine operating environment:
   receiving a suspected attack alarm from a centralized security monitoring apparatus;
   extracting, from the suspected attack alarm, an identifier used to associate the application;
   determining, in accordance with the identifier, the application associated with the suspected attack alarm;
   issuing, in accordance with the receiving a suspected attack alarm and the determining the application associated with the suspected attack alarm, a request for a monitoring program to be deployed to an operating environment of the application, wherein the monitoring program is executed in the operating environment to generate a monitoring information during operation of the application;
   obtaining, in accordance with the issuing the request and by executing the monitoring program deployed to and executed in the operating environment, the monitoring information of the application;
   determining, in accordance with the obtaining and based on the monitoring information of the application, the application has been attacked,
   stopping or isolating, in accordance with the determining the application has been attacked, the application; and
   deleting, after the determining the application has been attacked, the monitoring program from the operating environment of the application.

6. The non-transitory computer-readable medium according to claim 5, wherein the identifier comprises at least one of the group consisting of:
   an internet protocol (IP) address associated with the application,
   a port number associated with the application, and
   a uniform resource locator URL associated with the application.

7. The non-transitory computer-readable medium of claim 5, wherein the multi-machine operating environment comprises a plurality of physical machines operating in a network.

8. The non-transitory computer-readable medium of claim 5, wherein the multi-machine operating environment comprises a plurality of virtual machines.

9. The method of claim 1, wherein the multi-machine operating environment comprises a plurality of physical machines operating in a network.

10. The method of claim 1, wherein the multi-machine operating environment comprises a plurality of virtual machines.

11. The security management apparatus according to claim 3, wherein the multi-machine operating environment comprises a plurality of physical machines operating in a network.

12. The security management apparatus according to claim 3, wherein the multi-machine operating environment comprises a plurality of virtual machines.

* * * * *

UNITED STATES PATENT AND TRADEMARK OFFICE
CERTIFICATE OF CORRECTION

| | | |
|---|---|---|
| PATENT NO. | : 12,137,105 B2 | Page 1 of 1 |
| APPLICATION NO. | : 17/091877 | |
| DATED | : November 5, 2024 | |
| INVENTOR(S) | : Meng | |

It is certified that error appears in the above-identified patent and that said Letters Patent is hereby corrected as shown below:

In the Claims

Claim 4: Column 16, Line 16: "The apparatus according claim 3, wherein the identifier" should read as -- The apparatus according to claim 3, wherein the identifier --.

Claim 5: Column 16, Line 24: "Anon-transitory computer-readable medium compris-" should read as -- A non-transitory computer-readable medium compris- --.

Claim 5: Column 16, Line 50: "application has been attacked," should read as -- application has been attacked; --.

Signed and Sealed this
Third Day of June, 2025

Coke Morgan Stewart
*Acting Director of the United States Patent and Trademark Office*